April 27, 1954  E. FAIRCLOUGH ET AL  2,677,008
STORAGE BATTERY SEPARATOR
Filed Sept. 15, 1949  2 Sheets-Sheet 1

INVENTORS
CLARENCE C. ROSE
EDWARD FAIRCLOUGH
BY
Hudson, Boughton,
Williams, David & Hoffmann.
ATTORNEYS Patented Apr. 27, 1954

2,677,008

UNITED STATES PATENT OFFICE 2,677,008

STORAGE BATTERY SEPARATOR

Edward Fairclough, Bratenahl, and Clarence C. Rose, East Cleveland, Ohio, assignors to Willard Storage Battery Company, Cleveland, Ohio, a corporation of West Virginia Application September 15, 1949, Serial No. 115,874

3 Claims. (Cl. 136—146)

The present invention relates to storage battery plate separators and to a method of producing the same.

As is well known in the battery art, wood has been used extensively for separators in storage batteries to maintain the battery plates mechanically spaced and electrically insulated from one another while providing low resistance to the passage of electrolyte between and around the plates. The most satisfactory wood for this purpose is Port Orford cedar, which is now practically non-available and other more plentiful wood is not particularly suitable for the purpose being relatively high in cost and not particularly durable. Another disadvantage to wood separators is that they must be maintained moist and therefore they cannot be used in dry charged batteries.

Many attempts have been made to provide a separator which could be satisfactorily substituted for wood separators and one such separator which has been developed is made of natural rubber in a microporous sheet form. Although superior to wood separators in some respects, the rubber separator is more expensive to manufacture and the supply of natural rubber must come from outside this country which is a disadvantage as the supply is subject to disruption.

The principal object of the present invention is the provision of a new and improved battery plate separator which may be manufactured of readily available materials at a relatively low cost, has lasting physical strength when used in either wet or dry storage batteries and low electrolytic resistance.

Another object of the invention is the provision of a new and improved battery plate separator comprising a discontinuous film of synthetic resin having non-woven preferably heterogeneously arranged cellulose fibers therein forming a microporous sheet structure which is relatively rigid for good mechanical separation of battery plates while providing for low electrolytic resistance to current flow.

Another principal object of the invention is the provision of a new and improved method of forming battery plate separators, which method includes fabricating a sheeting of non-woven preferably heterogeneously arranged cellulose fibers, adding a given quantity of synthetic resin suspended in liquid to the sheeting, drying the liquid and flowing the residual resin by pressure and heat to surround the cellulose fibers and form a discontinuous resin film, including filamentary structure, which is relatively rigid and microporous.

Another object of the invention is the provision of a novel and improved battery plate separator which is formed principally of a web of non-woven cellulose fiber having approximately 50% to 60% by weight of resin introduced into the fiber web in latex form and fused and flowed about the fibers by heat and pressure to form resin filaments similar to the fibers, some of which filaments are interconnected by membranes of resin such that the resultant sheet is relatively rigid and microporous for physically separating the battery plates and at the same time is of low resistance to the passage of current through the battery electrolyte.

The invention resides in certain constructions and steps of process for producing the construction desired and further objects and advantages will be apparent to those skilled in the art to which it relates from the following description of the preferred embodiment described with reference to the accompanying drawings forming a part of this specification in which.

Figure 1:
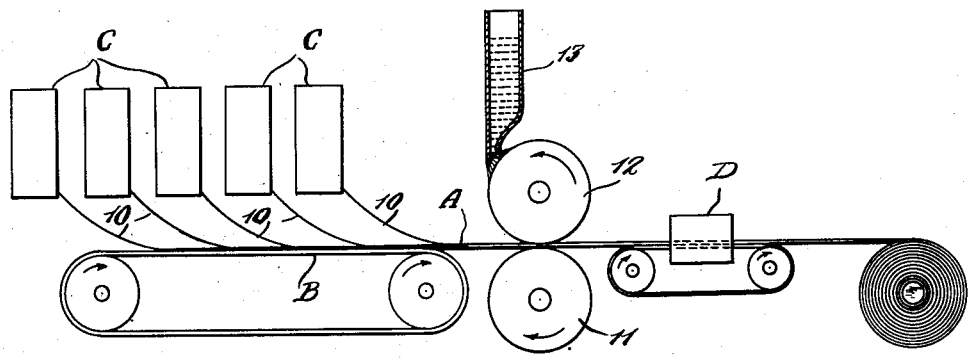
Fig. 1 is a diagrammatic view of an apparatus suitable for forming flat sheeting material to be used in fabricating storage battery plate separators according to the present invention.

In general, the invention contemplates a battery separator comprising a discontinuous film of resin which is not adversely affected by battery electrolyte and which has a webbing or sheeting of cellulose fibers, such as cotton, linen or wool, more or less imbedded in the film in such a manner as to give the film a microporous structure having in the order of from about 50% to 60% by weight of resin. The resin is applied in the form of latex to a loosely integrated sheet or lap of fibers and the resulting sheet heated and pressed to cause the resin to flow along and between the fibers so that the resin of the sheet is in the form of heterogeneously arranged filaments interconnected to some extent by membranes or films. In the preferred form of the invention the sheet has offset areas in the form of semi-spheres to provide additional rigidity and thickness to the separator.

In carrying out the preferred form of the invention, a cotton fiber lap or sheeting A of suitable width, is formed on a conveyor belt B by plying a number of thin cotton webs 10 produced by a series of cards C. More or fewer cards may be used than those shown, if desired, but in the present form, five cards are employed. The cotton is preferably reclaimed bleached cotton although it could be any suitable type of cotton. Other permeable fibers, such as linen or wool, can be used if desired. The fibers of the webs are more or less heterogeneously arranged, although they may tend to extend parallel due to the carding action. The plied, non-woven fibrous sheeting is passed between a pair of rolls 11, 12 and a synthetic, heat softenable or thermoplastic resin in the form of latex is distributed over the surface of roll 12 from a reservoir 13 and is absorbed by the fibrous sheeting. The latex is formed of small particles of incompletely polymerized resin and solvent which has been emulsified in water.

The resin preferably comprises a mixture of a copolymer of butadiene and styrene, and polystyrene in the proportion of approximately 25% styrene butadiene and approximately 75% polystyrene, by weight. Resins of this character which have proven to be satisfactory are those manufactured by the Dow Chemical Company, the styrene butadiene being identified as "513K" and two polystyrenes identified as "580G" and "319," respectively. The "580G" polystyrene has a molecular weight of approximately 80,000 and the "319" polystyrene has a molecular weight of approximately 500,000, the latter being the harder resin. As indicated previously, the resin mixture preferably comprises approximately 75% of either of the polystyrenes and 25% styrene butadiene, by weight. The percentage of the polystyrene employed may be decreased to approximately 40% with a corresponding increase in the styrene butadiene, but best results are obtained with the higher percentage of the polystyrene. Alternatively, suitable binders other than styrene butadiene may be used, such as a geon latex comprising polyvinyl chloride. Both polystyrenes are used without plasticizer.

The wet, impregnated cotton sheeting is passed from rolls 11, 12 through a drying oven D where it is heated sufficiently to dry and partially fuse the resin thereby binding the cotton fibers in a thin sheet which may be wound on a spool E for convenience in handling.

As mentioned hereinbefore, the finished separator should contain in the order of 50% to 60% resin, dry weight and the remainder cellulose fibers. The entire amount of resin desired in the finished separator may be added at one time to the sheeting, or as now practiced by applicant's assignee, the quantity of resin added to the sheet A contains slightly less than 30% resin and two of the sheets are plied and additional resin is added to the plied sheets in the manner described with reference to the initial treatment of the fiber webs. The resultant plied sheeting contains from about 50% to 60% resin, dry weight.

Figure 2:
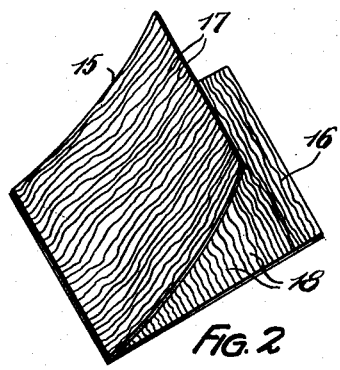
Fig. 2 is a perspective view showing two plies of sheeting material about to be superimposed.
Figure 3:
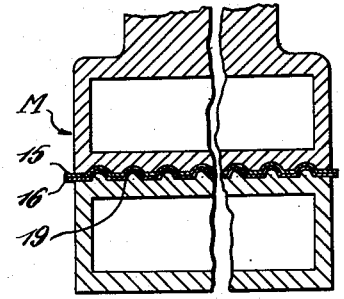
Fig. 3 is a section view of a die for embossing plied sheeting material.
Figure 4:
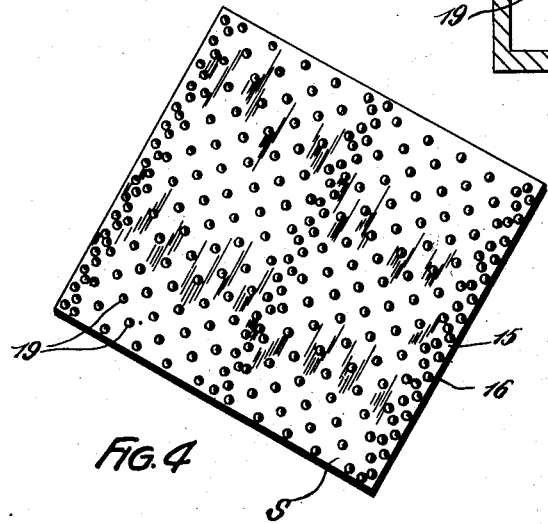
Fig. 4 is a perspective view of a finished plate separator.

The sheeting may be cut into convenient units prior to plying the same, if desired. The two sheet units 15, 16 shown have been cut to the size of a finished separator. The fibers of the sheeting A tend to extend longitudinally of the sheeting, due to the carding action, and the sheeting has more resistance to longitudinal stresses than to lateral stresses. To produce a separator having maximum strength in all directions, two sheet units 15, 16 are arranged one on the other with the majority of the fibers 17 of sheet 15 extending at right angles to the majority of the fibers 18 of sheet 16, as seen in Fig. 2.

In some instances it may be desirable to ply the sheets with the majority of the fibers of each sheet extending in one direction. This arrangement imparts exceptional rigidity in the separator in one direction which may facilitate insertion of the separators between battery plates and it also enables two lengthy strips of the sheeting to be plied and processed in a continuous form thereby materially reducing the handling of the material during fabrication of the separators. In the latter event, the separator units are severed from the strips of plied sheeting after one or more steps of the process have been performed following the plying of the sheeting.

The plied sheet units or plied sheeting, as the case may be, containing the desired amount of resin are then dried at a temperature of approximately 200° F. and when the latex is dried, the residual resin will be dispersed throughout the sheets and coats the fibrous filaments of the sheet.

The plied sheets are next placed in a mold press M which is maintained at a suitable temperature for causing the resin in the sheets to partially fuse and flow. In the present instance the mold is maintained at a temperature of approximately 325° F. by a suitable heating medium, such as steam. The mold press M is preferably formed to produce a pattern of closely spaced semispherical bosses 19 on the plied sheeting, and an initial pressure of approximately 100 lbs./sq. in. is applied to the sheets by the mold members for ten seconds after which a pressure of approximately 200 lbs./sq. in. is applied for about five seconds. The initial heating at 100 lbs./sq. in. preheats the sheeting and prevents tearing under the higher pressure. The high pressure and temperature causes the resin to partially fuse and flow throughout the fibrous structure of the sheet but without loss of porosity.

Figure 5:
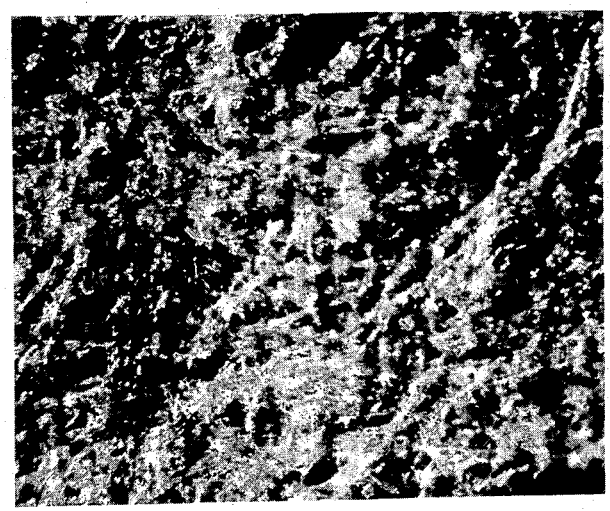
Fig. 5 is a photograph of a battery separator manufactured in accordance with the invention and showing the separator structure enlarged thirty-seven diameters.
Figure 6:
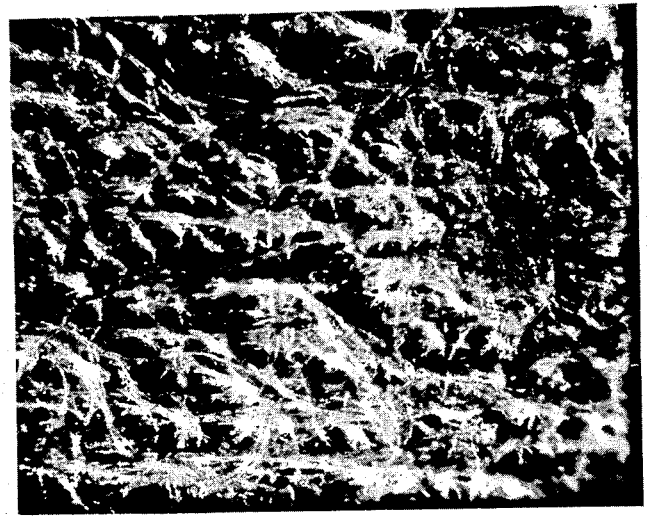
Fig. 6 is a photograph of a separator structure similar to that of Fig. 5 but having the cellulose fibers of the separator removed to show the nature of the plastic material.

After the sheet is released from the mold, or the temperature otherwise reduced, the resin becomes relatively rigid and in the form of heterogeneously arranged filaments, some of which are connected by films or membranes of resin, as seen in Fig. 5. This structure produces a relatively rigid sheet having tortuous minute passages therethrough and the cellulose fibers extending from one surface to the other form myriads of wicks which establish numerous electrolytic passages for current between the battery plates thereby providing a separator having low electrolytic resistance. The resin particles do not merely join the fibers together, but rather the resin surrounds the fibers and sets in a filamentary, porous pattern. This is shown in Fig. 6 which is an enlarged photograph of a separator made as described, but having the cotton fibers dissolved out to show the form assumed by the resin. The finished separator S has the pattern of semispherical offsets of dimples 19 fixed therein by the resin and these formations give the separator added rigidty and thickness. The sheeting comprising the separator is approximately .025" to .030" thick and the weight of the finished separator is approximately .15 to .20 grm. per square inch.

Although the separator shown has dimple forms of offsets, it is to be understood that other suitable forms of offsets or embossings could be impressed in the sheeting, as desired.

As mentioned hereinbefore, the original fibrous sheeting may be made up of a body of cellulose fibers heterogeneously arranged and of such density that when saturated with the resin latex and dried, a single ply of the sheeting will be of suitable thickness for use as a separator.

The quantity of resin added in the sheeting should comprise in the order of about 50% to 60% of the weight of the resulting sheeting and this may be accomplished by a single impregnation of the sheeting.

The resin which surrounds the fibers of the sheeting maintains the sheeting relatively rigid, even when wet, and the wick action of the fibers and the minute passages between the filamentary structure of the resin permits the passage of electrolyte, such as is required for efficient operation of the battery. The size of the pores or passages through the separator is such that battery plate material sluffing from the plates cannot pass through the separator and short circuit the battery plates. The cost of the materials and the cost of processing the same to form separators are relatively low so that the separator may serve as a good substitute for wood separators.

While the preferred form of the invention has been described in considerable detail, it will be apparent that the invention is not limited to the article and methods shown and described and it is my intention to cover hereby all adaptations, modifications and changes therein which come within the practice of those skilled in the art to which the invention relates and the scope of the appended claims.

Having thus described our invention, we claim:

1. A storage battery plate separator comprising filamentary resin in a bat-like sheet at least .025 inch thick and having the majority of the filaments of resin extending generally parallel to one another, films or membranes of like resin connecting or joining portions of said filaments and forming therewith a microporous relatively rigid sheet resistant to softening by and inert to battery electrolyte, said resin filaments having cores of cellulose fibers, the resin comprising approximately 50% to 60% by weight of the sheet and said sheet having a density of approximately .15 to .2 gram per square inch.

2. A storage battery plate separator comprising filamentary styrene butadiene and polystyrene resin in a bat-like sheet at least .025 inch thick and having the majority of the filaments of resin extending generally parallel to one another, films or membranes of like resin connecting adjacent portions of said filaments and forming therewith a microporous relatively rigid sheet resistant to softening by and inert to battery electrolyte, said resin filaments having cores of cellulose fibers, the resin comprising approximately 50% to 60%, by weight of the sheet and said sheet having a density of approximately .15 to .2 gram per square inch.

3. A storage battery plate separator comprising filamentary resin in a bat-like sheet at least .025 inch thick and having the majority of the filaments of resin therein extending generally parallel to one another, and films or membranes of like resin connecting or joining portions of said filaments and forming therewith a microporous relatively rigid sheet resistant to softening by and inert to battery electrolyte, said resin filaments having cores of cellulose fibers and comprising 25% to 50% styrene butadiene and 75% to 50% polystyrene, the resin comprising approximately 50% to 60% by weight of the sheet having a density of approximately .15 to .2 gram per square inch.

References Cited in the file of this patent

UNITED STATES PATENTS

| Number | Name | Date |
|---|---|---|
| 649,003 | Sperry | May 8, 1900 |
| 1,500,220 | Benner | July 8, 1924 |
| 1,744,256 | Benner et al. | Jan. 21, 1930 |
| 2,161,383 | Reinhardt et al. | June 6, 1939 |
| 2,306,781 | Francis, Jr. | Dec. 29, 1942 |
| 2,416,232 | Soday | Feb. 18, 1947 |
| 2,441,523 | Ward | May 11, 1948 |
| 2,474,801 | Owen | June 28, 1949 |
| 2,492,124 | Young et al. | Dec. 20, 1949 |
| 2,531,504 | Dillehay et al. | Nov. 28, 1950 |
| 2,540,996 | Ryden | Feb. 6, 1951 |
| 2,566,960 | Philipps | Sept. 4, 1951 |

OTHER REFERENCES

Winkelmann: "Plastics in the Rubber Industry," India Rubber World, volume 113, No. 6, March 1946, pages 799–804.